(12) United States Patent
Mullen et al.

(10) Patent No.: US 12,380,307 B1
(45) Date of Patent: Aug. 5, 2025

(54) ADVANCED CARD APPLICATIONS

(76) Inventors: Jeffrey D. Mullen, Pittsburgh, PA (US);
Philip W. Yen, Cupertino, CA (US);
Christopher J. Rigatti, Pittsburgh, PA (US)

(*) Notice: Subject to any disclaimer, the term of this patent is extended or adjusted under 35 U.S.C. 154(b) by 0 days.

(21) Appl. No.: 12/825,589

(22) Filed: Jun. 29, 2010

Related U.S. Application Data

(60) Provisional application No. 61/221,319, filed on Jun. 29, 2009.

(51) Int. Cl.
*G06K 19/06* (2006.01)
*G06K 7/08* (2006.01)

(52) U.S. Cl.
CPC ....... *G06K 19/06206* (2013.01); *G06K 7/087* (2013.01); *G06K 19/06187* (2013.01)

(58) Field of Classification Search
CPC .... A63F 13/00; G06Q 20/327; G06Q 20/352; G07F 7/084; G07F 17/3251; G07F 17/3202; G07F 17/3223; G07F 17/32; G06K 19/06206; G06K 1/125; G06K 7/08; G06K 19/0708; G06K 7/10841; G06K 7/10564; G06K 7/10722; G06K 7/14; G06K 19/07705
USPC ...... 235/492, 493, 380; 463/16, 40; 713/186
See application file for complete search history.

(56) References Cited

U.S. PATENT DOCUMENTS

| | | | |
|---|---|---|---|
| 3,899,659 A | * | 8/1975 | Nakai ............. G06K 13/07 360/2 |
| 4,353,064 A | | 10/1982 | Stamm |
| 4,394,654 A | | 7/1983 | Hofmann-Cerfontaine |
| 4,614,861 A | | 9/1986 | Pavlov et al. |
| 4,667,087 A | | 5/1987 | Quintana |
| 4,701,601 A | | 10/1987 | Francini et al. |
| 4,720,860 A | | 1/1988 | Weiss |
| 4,786,791 A | | 11/1988 | Hodama |
| 4,791,283 A | | 12/1988 | Burkhardt |
| 4,797,542 A | | 1/1989 | Hara |
| 4,868,376 A | * | 9/1989 | Lessin ............. G06K 19/077 235/487 |

(Continued)

FOREIGN PATENT DOCUMENTS

| | | | | |
|---|---|---|---|---|
| EP | | 700980 B1 | * 11/1999 | ............. C09D 11/50 |
| JP | | 05210770 A | 8/1993 | |

(Continued)

OTHER PUBLICATIONS

Emulating Concurrency in a Circuit Card Assembly System (Year: 1991).*

(Continued)

*Primary Examiner* — Thien T Mai
(74) *Attorney, Agent, or Firm* — Morris Law Group; Robert W. Morris

(57) ABSTRACT

Advanced card applications are provided to improve payment, security, identification, organization, medical, entertainment and other functionalities. A dynamic magnetic stripe communications device is provided that can dynamically change any information communicated to a magnetic stripe reader. A light sensing device is provided that can receive information optically via visible or non-visible light. Accordingly, a display may communicate information to a light sensing unit. Accordingly, a card is operable to receive data as well as transmit dynamic data.

21 Claims, 7 Drawing Sheets

(56) References Cited

U.S. PATENT DOCUMENTS

| | | |
|---|---|---|
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |
| 5,434,405 A | 7/1995 | Finkelstein et al. |
| 5,478,994 A | 12/1995 | Rahman |
| 5,479,512 A | 12/1995 | Weiss |
| 5,484,997 A | 1/1996 | Haynes |
| 5,485,519 A | 1/1996 | Wallerstein |
| 5,585,787 A | 12/1996 | Wallerstein |
| 5,591,949 A | 1/1997 | Bernstein |
| 5,608,203 A | 3/1997 | Finkelstein et al. |
| 5,623,552 A | 4/1997 | Lane |
| 5,657,388 A | 8/1997 | Weiss |
| 5,834,747 A | 11/1998 | Cooper |
| 5,834,756 A | 11/1998 | Gutman et al. |
| 5,856,661 A | 1/1999 | Finkelstein et al. |
| 5,864,623 A | 1/1999 | Messina et al. |
| 5,907,142 A | 5/1999 | Kelsey |
| 5,913,203 A | 6/1999 | Wong et al. |
| 5,937,394 A | 8/1999 | Wong et al. |
| 5,955,021 A | 9/1999 | Tiffany, III |
| 5,956,699 A | 9/1999 | Wong et al. |
| 6,025,054 A | 2/2000 | Tiffany, III |
| 6,045,043 A | 4/2000 | Bashan et al. |
| 6,076,163 A | 6/2000 | Hoffstein et al. |
| 6,085,320 A | 7/2000 | Kaliski |
| 6,095,416 A | 8/2000 | Grant et al. |
| 6,130,621 A | 10/2000 | Weiss |
| 6,145,079 A | 11/2000 | Mitty et al. |
| 6,157,920 A | 12/2000 | Jakobsson et al. |
| 6,161,181 A | 12/2000 | Haynes, III et al. |
| 6,176,430 B1 | 1/2001 | Finkelstein et al. |
| 6,182,894 B1 | 2/2001 | Hackett et al. |
| 6,189,098 B1 | 2/2001 | Kaliski |
| 6,199,052 B1 | 3/2001 | Mitty et al. |
| 6,206,293 B1 | 3/2001 | Gutman et al. |
| 6,240,184 B1 | 5/2001 | Huynh et al. |
| 6,241,153 B1 | 6/2001 | Tiffany, III |
| 6,256,873 B1 | 7/2001 | Tiffany, III |
| 6,269,163 B1 | 7/2001 | Rivest et al. |
| 6,286,022 B1 | 9/2001 | Kaliski et al. |
| 6,308,890 B1 | 10/2001 | Cooper |
| 6,313,724 B1 | 11/2001 | Osterweil |
| 6,389,442 B1 | 5/2002 | Yin et al. |
| 6,393,447 B1 | 5/2002 | Jakobsson et al. |
| 6,411,715 B1 | 6/2002 | Liskov et al. |
| 6,446,052 B1 | 9/2002 | Juels |
| 6,460,141 B1 | 10/2002 | Olden |
| 6,592,044 B1 | 7/2003 | Wong et al. |
| 6,607,127 B2 | 8/2003 | Wong |
| 6,609,654 B1 | 8/2003 | Anderson et al. |
| 6,631,849 B2 | 10/2003 | Blossom |
| 6,655,585 B2 | 12/2003 | Shinn |
| 6,681,988 B2 | 1/2004 | Stack et al. |
| 6,705,520 B1 | 3/2004 | Pitroda et al. |
| 6,755,341 B1 | 6/2004 | Wong et al. |
| 6,764,005 B2 | 7/2004 | Cooper |
| 6,769,618 B1 | 8/2004 | Finkelstein |
| 6,805,288 B2 | 10/2004 | Routhenstein et al. |
| 6,811,082 B2 | 11/2004 | Wong |
| 6,813,354 B1 | 11/2004 | Jakobsson et al. |
| 6,817,532 B2 | 11/2004 | Finkelstein |
| 6,873,974 B1 | 3/2005 | Schutzer |
| 6,902,116 B2 | 6/2005 | Finkelstein |
| 6,970,070 B2 | 11/2005 | Juels et al. |
| 6,980,969 B1 | 12/2005 | Tuchler et al. |
| 6,985,583 B1 | 1/2006 | Brainard et al. |
| 6,991,155 B2 | 1/2006 | Burchette, Jr. |
| 7,013,030 B2 | 3/2006 | Wong et al. |
| 7,035,443 B2 | 4/2006 | Wong |
| 7,039,223 B2 | 5/2006 | Wong |
| 7,044,394 B2 | 5/2006 | Brown |
| 7,051,929 B2 | 5/2006 | Li |
| 7,083,094 B2 | 8/2006 | Cooper |
| 7,100,049 B2 | 8/2006 | Gasparini et al. |
| 7,100,821 B2 | 9/2006 | Rasti |
| 7,111,172 B1 | 9/2006 | Duane et al. |
| 7,114,652 B2 | 10/2006 | Moullette et al. |
| 7,136,514 B1 | 11/2006 | Wong |
| 7,140,550 B2 | 11/2006 | Ramachandran |
| 7,163,153 B2 | 1/2007 | Blossom |
| 7,195,154 B2 | 3/2007 | Routhenstein |
| 7,197,639 B1 | 3/2007 | Juels et al. |
| 7,219,368 B2 | 5/2007 | Juels et al. |
| 7,225,537 B2 | 6/2007 | Reed |
| 7,225,994 B2 | 6/2007 | Finkelstein |
| 7,246,752 B2 | 7/2007 | Brown |
| 7,298,243 B2 | 11/2007 | Juels et al. |
| 7,334,732 B2 | 2/2008 | Cooper |
| 7,337,326 B2 | 2/2008 | Palmer et al. |
| 7,346,775 B2 | 3/2008 | Gasparini et al. |
| 7,356,696 B1 | 4/2008 | Jakobsson et al. |
| 7,357,319 B1 | 4/2008 | Lin et al. |
| 7,359,507 B2 | 4/2008 | Kaliski |
| 7,360,688 B1 | 4/2008 | Harris |
| 7,363,494 B2 | 4/2008 | Brainard et al. |
| 7,380,710 B2 | 6/2008 | Brown |
| 7,398,253 B1 | 7/2008 | Pinnell |
| 7,404,087 B2 | 7/2008 | Teunen |
| 7,424,570 B2 | 9/2008 | D'Albore et al. |
| 7,427,033 B1 | 9/2008 | Roskind |
| 7,454,349 B2 | 11/2008 | Teunen et al. |
| 7,461,250 B1 | 12/2008 | Duane et al. |
| 7,461,399 B2 | 12/2008 | Juels et al. |
| 7,472,093 B2 | 12/2008 | Juels |
| 7,472,829 B2 | 1/2009 | Brown |
| 7,494,055 B2 | 2/2009 | Fernandes et al. |
| 7,502,467 B2 | 3/2009 | Brainard et al. |
| 7,502,933 B2 | 3/2009 | Jakobsson et al. |
| 7,503,485 B1 | 3/2009 | Routhenstein |
| 7,516,492 B1 | 4/2009 | Nisbet et al. |
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,828,207 B2 | 11/2010 | Cooper |
| 2001/0003099 A1* | 6/2001 | Von Kohorn ........ H04N 7/0806 463/16 |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0061778 A1* | 5/2002 | Acres .................. G07F 17/323 463/40 |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |

(56) References Cited

U.S. PATENT DOCUMENTS

| | | | |
|---|---|---|---|
| 2004/0035942 A1* | 2/2004 | Silverman | G06K 19/06206 235/493 |
| 2004/0133787 A1* | 7/2004 | Doughty | G07F 7/1075 713/186 |
| 2004/0159700 A1* | 8/2004 | Khan | G06Q 20/327 235/380 |
| 2004/0162732 A1 | 8/2004 | Rahim et al. | |
| 2004/0172535 A1 | 9/2004 | Jakobsson | |
| 2004/0177045 A1 | 9/2004 | Brown | |
| 2005/0043997 A1 | 2/2005 | Sohata et al. | |
| 2005/0080747 A1 | 4/2005 | Anderson et al. | |
| 2005/0086160 A1 | 4/2005 | Wong et al. | |
| 2005/0086177 A1 | 4/2005 | Anderson et al. | |
| 2005/0116026 A1 | 6/2005 | Burger et al. | |
| 2005/0119940 A1 | 6/2005 | Concilio et al. | |
| 2005/0154643 A1 | 7/2005 | Doan et al. | |
| 2005/0228959 A1 | 10/2005 | D'Albore et al. | |
| 2006/0000900 A1 | 1/2006 | Fernandes et al. | |
| 2006/0037073 A1 | 2/2006 | Juels et al. | |
| 2006/0041759 A1 | 2/2006 | Kaliski et al. | |
| 2006/0063576 A1* | 3/2006 | Schwartz | A63F 3/00643 463/11 |
| 2006/0085328 A1 | 4/2006 | Cohen et al. | |
| 2006/0091223 A1 | 5/2006 | Zellner | |
| 2006/0161435 A1 | 7/2006 | Atef et al. | |
| 2006/0163353 A1 | 7/2006 | Moulette et al. | |
| 2006/0174104 A1 | 8/2006 | Crichton et al. | |
| 2006/0196931 A1 | 9/2006 | Holtmanns et al. | |
| 2006/0256961 A1 | 11/2006 | Brainard et al. | |
| 2007/0034700 A1 | 2/2007 | Poidomani et al. | |
| 2007/0114274 A1 | 5/2007 | Gibbs et al. | |
| 2007/0124321 A1 | 5/2007 | Szydlo | |
| 2007/0152070 A1 | 7/2007 | D'Albore | |
| 2007/0152072 A1 | 7/2007 | Frallicciardi et al. | |
| 2007/0153487 A1 | 7/2007 | Frallicciardi et al. | |
| 2007/0174614 A1 | 7/2007 | Duane et al. | |
| 2007/0241183 A1 | 10/2007 | Brown et al. | |
| 2007/0241201 A1 | 10/2007 | Brown et al. | |
| 2007/0256123 A1 | 11/2007 | Duane et al. | |
| 2007/0192249 A1 | 12/2007 | Biffle et al. | |
| 2007/0291753 A1 | 12/2007 | Romano | |
| 2008/0005510 A1 | 1/2008 | Sepe et al. | |
| 2008/0008315 A1 | 1/2008 | Fontana et al. | |
| 2008/0008322 A1 | 1/2008 | Fontana et al. | |
| 2008/0010675 A1 | 1/2008 | Massascusa et al. | |
| 2008/0016351 A1 | 1/2008 | Fontana et al. | |
| 2008/0019507 A1 | 1/2008 | Fontana et al. | |
| 2008/0028447 A1 | 1/2008 | O'Malley et al. | |
| 2008/0040271 A1 | 2/2008 | Hammad et al. | |
| 2008/0040276 A1 | 2/2008 | Hammad et al. | |
| 2008/0058016 A1 | 3/2008 | Di Maggio et al. | |
| 2008/0059379 A1 | 3/2008 | Ramaci et al. | |
| 2008/0096326 A1 | 4/2008 | Reed | |
| 2008/0126398 A1 | 5/2008 | Cimino | |
| 2008/0128515 A1 | 6/2008 | Di Iorio | |
| 2008/0148394 A1 | 6/2008 | Poidomani et al. | |
| 2008/0201264 A1 | 8/2008 | Brown et al. | |
| 2008/0209550 A1 | 8/2008 | Di Iorio | |
| 2008/0288699 A1 | 11/2008 | Chichierchia | |
| 2008/0294930 A1 | 11/2008 | Varone et al. | |
| 2008/0302877 A1 | 12/2008 | Musella et al. | |
| 2009/0013122 A1 | 1/2009 | Sepe et al. | |
| 2009/0036147 A1 | 2/2009 | Romano | |
| 2009/0046522 A1 | 2/2009 | Sepe et al. | |
| 2009/0108064 A1 | 4/2009 | Fernandes et al. | |
| 2009/0150295 A1 | 6/2009 | Hatch et al. | |
| 2009/0152365 A1 | 6/2009 | Li et al. | |
| 2009/0186690 A1* | 7/2009 | Toth | G07F 17/32 463/25 |
| 2009/0242648 A1 | 10/2009 | Di Sirio et al. | |
| 2009/0244858 A1 | 10/2009 | Di Sirio et al. | |
| 2009/0253460 A1 | 10/2009 | Varone et al. | |
| 2009/0255996 A1 | 10/2009 | Brown et al. | |
| 2009/0290704 A1 | 11/2009 | Cimino | |
| 2009/0303885 A1 | 12/2009 | Longo | |
| 2010/0304819 A1* | 12/2010 | Stockdale | G07F 17/32 463/16 |
| 2010/0311488 A1* | 12/2010 | Miller | A63F 1/12 463/31 |
| 2011/0028184 A1 | 2/2011 | Cooper | |

FOREIGN PATENT DOCUMENTS

| | | |
|---|---|---|
| WO | WO9852735 | 11/1998 |
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/594,300, Poidomani et al.
U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

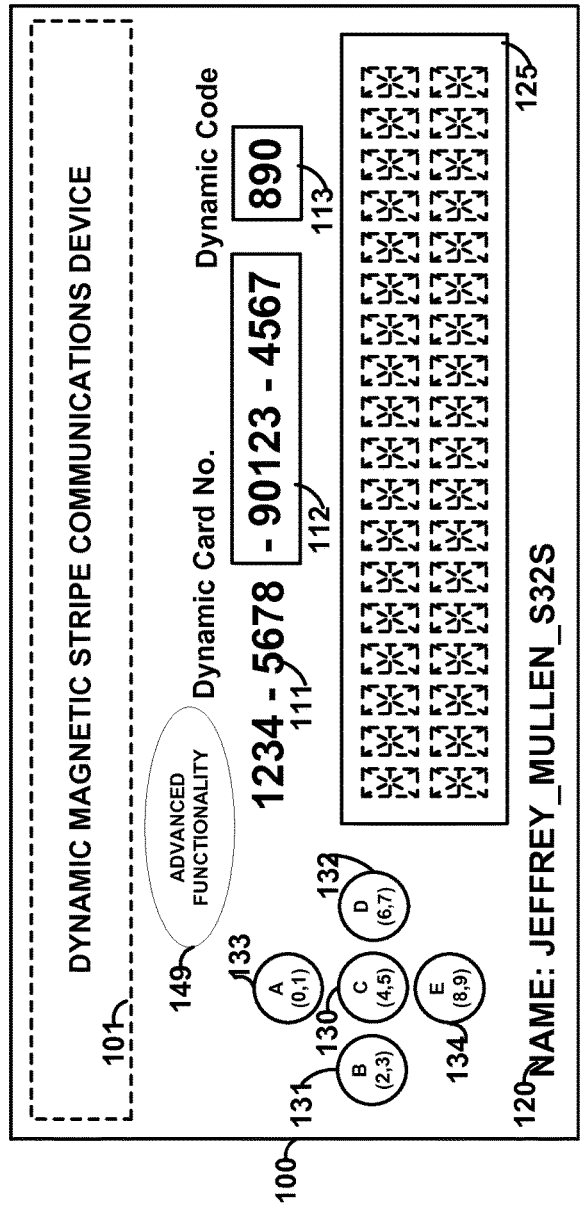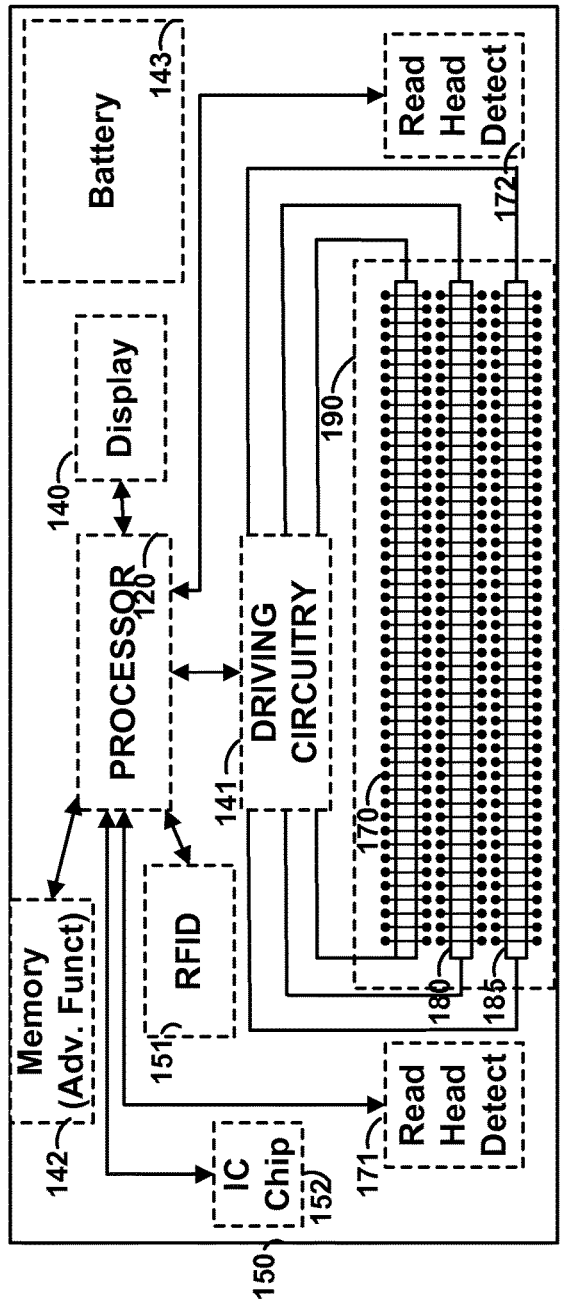
FIG. 1

ADVANCED CARD APPLICATIONS

CROSS-REFERENCE TO RELATED APPLICATIONS

This application claims the benefit of U.S. Provisional Patent Application No. 61/221,319, titled "ADVANCED CARD APPLICATIONS", filed Jun. 29, 2009, which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor may perform the processing capabilities of, for example, an exposed IC chip such as an EMV chip. The processor may be laminated over and not exposed such that such a processor is not exposed on the surface of the card.

Advanced payment features are provided on cards. Such features may utilize data received wirelessly (or via a wire such as USB) after the issuance and delivery of a card to a user. Such features may utilize manual input to receive indication of a user's desires at a particular instance. Such features may communicate dynamic data to magnetic stripe readers via, for example, a dynamic magnetic stripe communications device. Data communicated via a dynamic magnetic stripe communications device may include, for example, various payment card accounts and related discretionary data.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 1 is an illustration of cards constructed in accordance with the principles of the present invention;

DETAILED DESCRIPTION OF THE INVENTION

Figure 2:
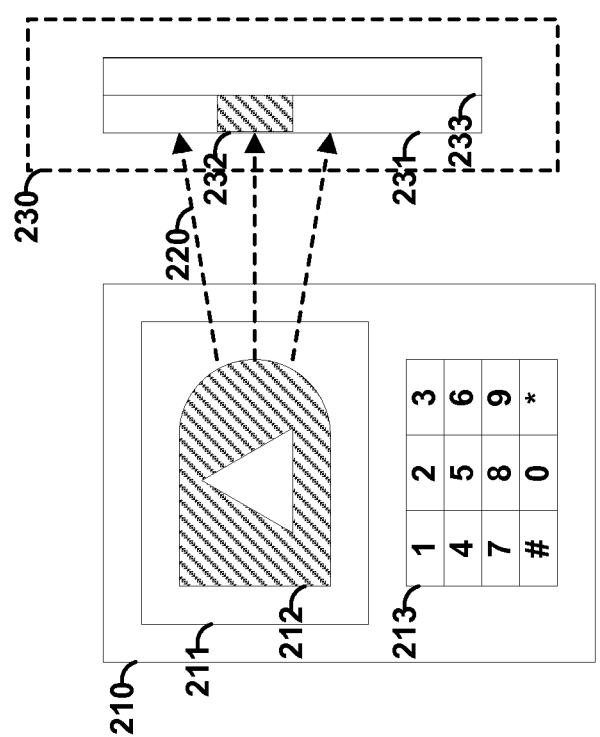
FIG. 2 is an illustration of a mobile device and card constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination of mechanical and capacitive buttons.

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120. Memory 142 may be coupled to processor 120. Memory 142 may include data that is unique to a particular card. Advanced functionality may be obtained, for example, via button 149. A user pressing button 149 may cause, for example, corresponding data to be communicated through a dynamic magnetic stripe communications device.

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader. A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for a particular magnetic stripe track. Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185. Memory 142 may include, for example, advanced payment functionality data. Such data may be retrieved, for example, and communicated through a dynamic magnetic stripe communications device or other output device (e.g., an RFID or exposed IC chip).

FIG. 2 shows mobile device 210 and card 230. An application may be installed, for example, on mobile device 210 that is operable to communicate with a remote server, such as a remote server operable to access databases of a bank. A user may enter manual input into mobile device 210 such that mobile device 210 retrieves data from one or more databases of a bank via the remote server. Mobile device 210 may then communicate data to card 230 either wirelessly or via a wire. Mobile device 210 may be, for example, a mobile telephonic device, a laptop computer, a tablet computer, or any other mobile device. Mobile device 210 may receive manual input, for example, via one or more buttons 213. A user may visually navigate through display 211. Persons skilled in the art will appreciate that display 211 may, for example, be a touch-sensitive display capable of receiving manual input and displaying information to a user. When mobile device 210, for example, desires to communicate data to card 230, indicia 212 may appear on display 211 and pulsate light to card 230 in order to communicate information to card 230. A user may retrieve information from card 230 (e.g., via a display 230) and communicate this information to mobile device 210 (e.g., via manual input) in order to, for example, identify card 230 such that this identification information may be communicated to a remote server via mobile device 210.

Information may be communicated through light, for example, by changing the speed of light pulses, changing the intensity of pulses, and/or changing the color of light provided to card 230. Card 230 may receive light 220 via light sensing unit 232. Light sensing unit 232 may include, for example, one or more light sensors. Light sensing unit 232 may be electronically coupled to layer 233, which may include interconnections to other components of card 230 (e.g., a processor, surface-exposed IC chip, RFID antenna, dynamic magnetic stripe communications device). Laminate 231 may be provided (e.g., via injection molding) around component 232. Such laminate may also be provided above light sensing unit 232 such that light sensing 232 is not exposed outside of card 230. Such a laminate may be, for example, silicon-based or polyurethane-based. Accordingly, for example, card 230 may receive information from mobile device 210, store this information on memory, retrieve this information at the direction of a user (e.g., via manual input on card 230), and communicate this retrieved information through one or more output devices such as, for example, a dynamic magnetic stripe communications device, RFID, or exposed IC chip.

Figure 3:
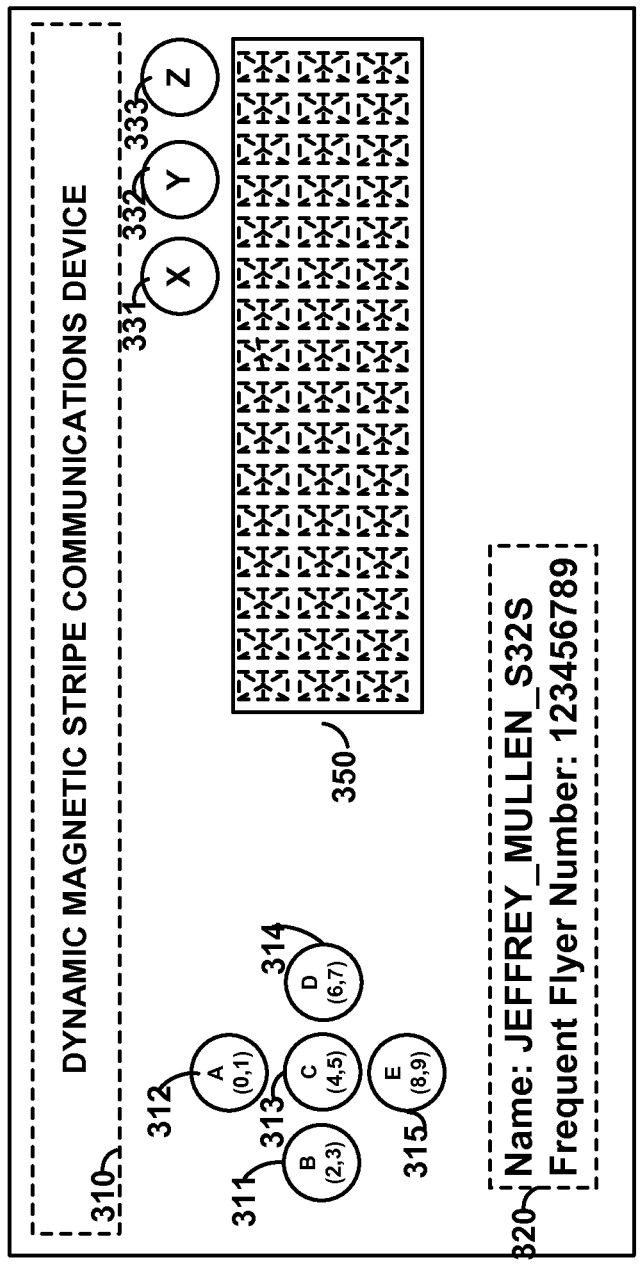
FIG. 3 is an illustration of a card constructed in accordance with the principles of the present invention.

FIG. 3 shows card 300 that may include, for example, dynamic magnetic stripe communications device 310, user interfaces 311-315, user information 320, display 350, and user interfaces 331-333.

A card may include multiple payment products on a card. A different payment account number may be associated with each payment product. A user may change the payment products on a particular card via, for example, manual input using manual interfaces or receiving information wirelessly via light or sound. For example, a user may hold a light up to a display to receive information from that display. A card issuer may, for example, wirelessly communicate to a card (e.g., via a wireless communications signal such as a cellular signal) to remove a product or change a product without the permission or an action of the user. Characteristics of a card may be changed such as, for example, an expiration date. Accordingly, for example, an expiration date may be displayed on a display. A user may receive a new expiration date wirelessly (e.g., via light, sound, or other wireless communication) and this new expiration date may be displayed to a user.

Advanced reward features are provided. A card may provide information dynamically via an output device (e.g., a dynamic magnetic stripe communications device) indicative of a user's desire to pay for a transaction with points instead of with currency. Point totals may be communicated to a card and such point totals may be displayed on a card. Point totals may be communicated to a card wirelessly (e.g., via light) or via a wire (e.g., via USB). Similarly, for example, information may be communicated to a card indicative of how many points are earned for each dollar of debit and/or each dollar of credit. Additionally, point thresholds may be communicated to a card indicative, for example, when an increase in status level may be achieved. Different status levels may, for example, provide a cardholder with different benefits. The higher a status level, the more benefits may be provided to a cardholder. Information received by a card may be, for example, displayed on one or more displays. Such information may be displayed, for example, once the information is downloaded as well as when the card is directed to display such information (e.g., via one or more buttons).

Advanced membership features are provided. Club membership information may be communicated to a card (e.g., via light) so that the card may later communicate this club membership information to gain access to a club (e.g., airline lounges). The card may communicate this information, for example, at the direction of a user (e.g., via manual input into a button on a card) via one or more output devices (e.g., a dynamic magnetic stripe communications device, RFID, or exposed IC chip).

Advanced ticketing features are provided. Ticket information may be communicated to a card (e.g., via light) so that a card may store this ticketing information and later communicate this ticketing information (e.g., via an output device) to gain access to an event or to view ticket information. Ticketing information may, for example, take the form of a barcode that is received (e.g., via light), stored on the card, and displayed on a display at the direction of a user (e.g., via manual input on a button). Additionally, for example, ticket information may be utilized at a ticketing outlet to obtain physical tickets. Ticket information may be utilized such that a card may be treated as a physical ticket at an access location that requires a physical ticket. Examples of tickets may include, for example, airline tickets, movie tickets, concert tickets, or other event or travel tickets. Multiple tickets may be stored on a card. For example, a user may download multiple tickets and utilize buttons on a card to scroll between tickets. A user may press a button after locating a ticket in order to communicate associated information (e.g., via a programmable magnetic stripe) or display associated information (e.g., via a barcode). Alternatively, for example, a single ticket may be issued for a group of tickets. Furthering this example, a user may purchase, online via a website, a number of movie tickets. An aggregate ticket that represents all of the purchased tickets may be communicated to a card via light (e.g., via indicia on the display that provides light pulses indiciative of information). Persons skilled in the art will appreciate that any data communicated via an RFID, exposed IC, or dynamic magnetic stripe communications device may be displayed as a barcode and communicated to a system (e.g., an electronic cash register) via a vision system.

Advanced instant issuance features are provided. For example, the magnetic stripe data for a payment card (e.g., tracks 1 and 2 of magnetic stripe data), information for display on the front of a card (e.g., user name and expiration date), and artwork (e.g., bank logo) may be communicated to a card (e.g., via light) so a card may, for example, be instantly issued on a card and operable to communicate data through a magnetic stripe reader. A card may be mailed to a user. The card may include an identifying number printed on the card itself, a sticker placed on the card (e.g., including an activation telephone number), or another part of the mailing (e.g., a piece of paper included in the mailing envelop). A user may enter this number into a website provided by the card issuer to confirm receipt of a card. Alternatively, no number may be provided and entered by a user. A user, for example, may log into the website of an issuer to identify the user. The user may be provided with a virtual button on the website in order to personalize the user's card. Upon pressing the button, for example, data may be communicated to the card (e.g., via light pulses). The data may be stored on the card and utilized to configure the card. For example, track 1 and track 2 data may be stored and may be retrieved upon pressing a particular button on the card. Multiple accounts of data or multiple pairs of track data may be communicated. For example, two pairs of track 1 and track 2 data blocks may be communicated to a card and a particular pair may be communicated via an output device upon the activation of a particular button. Data received for displaying on a card's display (e.g., user name, expiration date, security code, account number, issuer logo, and/or association logo) may be stored and displayed on a display upon the activation of a particular button or buttons. Persons skilled in the art will appreciate that information may be displayed or communicated autonomously on a card without receiving manual input from a user. Additional information may also be communicated such as, for example, information to utilize other components of a card (e.g., the definition of a particular LED operation when a particular button is pressed). Persons skilled in the art will appreciate that card activation may also occur via, for example, light information received via a graphical user interface. For example, a particular activation code may be communicated to a card (e.g., via light). This activation code may be communicated in track 1, track 2, and/or track 3 data from a magnetic stripe communications device for a particular number of communications (e.g., 50) or for all communications. A remote server may receive this activation code at the first purchase utilizing the card and may utilize this code to confirm that the appropriate user personalized and activated the card. Furthermore, for example, the personalization of a card may be provided such that a portion of personal data (e.g., a portion of one or more payment account numbers) is pre-stored on a card before mailing and a different portion is communicated to the card after the card is received by a user (e.g., via light). In doing so, a communication from a graphical user interface to a card may be insecure, but may not expose all of the personal data needed to complete a purchase transaction.

The functionality of multiple different types of cards may be placed on a single card. For example, magnetic stripe data issued from different organizations may be stored on a single card. For example, a card may receive particular manual input and communicate security access data to a magnetic stripe reader (or on a display) for security access purposes. As per another example, a card may receive particular manual input and may communicate meal coupons to a magnetic stripe reader. An academic or government identification card may store, for example, identification information, security access information, and payment information that may be separately communicated to a magnetic stripe reader based on received manual input. Any combination of credit card accounts, debit card accounts, gift card accounts, pre-paid card accounts, decoupled debit card accounts, transit card accounts, loyalty card accounts, check card accounts, charge card accounts, meal card accounts, identification card accounts, security card accounts, entertainment card accounts, and/or medical card accounts may be stored in memory, retrieved upon particular manual input received via one or more buttons, and communicated via an output device and/or displayed via a display. Data associated to each account may also be communicated via an output device and/or displayed via a display. Any functionality of any card or device described herein may be provided on a card or device having other functionality described herein.

Card personalization features may be provided on a card. For example, a user may select one or more sounds on a website or mobile device to play on a card when a particular card operation occurs. For example, a user may select the sound of a cash-register opening whenever a card-to-card payment is made. As per another example, a user may select the voice of a celebrity from a movie (e.g., "I'll be back" by Arnold Schwarzenneger in Terminator II) whenever a card turns OFF. User-customized events may occur, for example, when a card turns ON/OFF, performs a particular function (e.g., is swiped through a magnetic stripe reader), or in response to particular user input (e.g., a user entering a correct unlocking code to unlock a card). A user may personalize events by providing for a custom sound, custom indicia on a display screen, a particular type of indication from a light (e.g., a particular color), or any other type of custom indications. Such custom indications may be communicated to a card by a user via, for example, wireless or wire-based communications. For example, a user may be provided with a virtual card on a website or a user's phone so the user may test the proposed customizations in a virtual world before communicating the customizations to a card (e.g., via light from a mobile telephonic device).

The attributes of payment types may be adjusted by a user. For example, a cardholder may go to an issuer's website on a web browser on a computer, or via an application on a mobile telephonic device, and adjust the attributes of payment types or select new payment types for use on the cardholder's physical card. For example, a user may adjust a cashback amount, an installment period, a deferred payment period, or a top-up amount associated with particular payment products. Information about these selections may be communicated to a card (e.g., via light) and communicated via an output device and/or displayed on a display. For example, the installment period for an installment pay option may be communicated to a card and displayed to a user whenever the user selects an installment pay option to remind the user of the user's selection (e.g., by pressing a particular button). A user may adjust attributes of payment types on a card and these adjustments may be communicated through a network (e.g., via a dynamic magnetic strip communications device). Additionally features associated with buttons may be changed on a remote server. In doing so, functionality may be changed, but the same information may be communicated through a dynamic magnetic stripe communications device (or other output device).

Persons skilled in the art will appreciate that any feature provided in a card may be provided on a mobile telephonic device and associated data communicated to a remote server via a number of intermediary devices (e.g., via an RFID reader or via another mobile telephonic device) or directly by that mobile telephonic device. Accordingly, for example, a virtual card may be provided on a display of a mobile device, such as a mobile telephonic device. A user may interact with the displayed virtual card via virtual buttons provided by a graphical user interface and touch-sensitive screen (or other device). Any virtual button on a mobile device, for example, may correspond to any button on a card described herein.

A card may autonomously turn OFF after a period of time of inactivity. Such inactivity may be pre-determined, or defined by a user, as an amount of time after receiving manual input, an amount of time after communicating data to a reader, or an amount of time after receiving manual input or communicating data to a reader, whichever occurs later. A cardholder may change, for example, the period of inactivity before a card turns OFF. This time may be communicated to a card (e.g., via light pulses from a graphical user interface).

An administrator may change the attributes of a card via updates to a card. A cardholder may be notified of an update, for example, on a user's mobile phone (e.g., via an application or text message), via an email, or via a webpage. Such an update may be communicated to a card wirelessly (e.g., via light) or via a wire-based communication. An administrator may unauthorize a product or products on a remote server so that those products may not authorize at that remote server until an update occurs. Accordingly, for example, a user may initiate the communication of an update to a card such that a product or products on a card may be re-authorized to function properly. Such an update, for example, may change the magnetic stripe information for a product as well as the information displayed to a user.

Persons skilled in the art will appreciate that a card may include a wireless electromagnetic receiver such that, for example, wireless communications may be pushed onto a card. In doing so, for example, the card may be remotely updated autonomously and without the interaction of a cardholder.

A card may communicate data to another card (e.g., via card-to-card communications). For example, business card information may be pre-stored on a corporate credit card. A cardholder may update his/her business card information on another device (e.g., a phone or computer) and communicate this new business card to the corporate credit card. A user may then communicate his/her business card information to another user's card via, for example, a list-based communications channel established between light sensing/emitting units on the individual cards.

A cardholder may enter manual input into a card and transmit an account number, currency amount, and security information to another card. The receiving card's user may then communicate this information to a remote server (e.g., via a magnetic stripe reader or manual input) and an account of the receiving card's user may be debited by the currency amount. A transaction fee may be removed from one or both of the transmitting and receiving cardholder's accounts. The currency amount may be removed from the transmitting user's account.

A card may be used to store communicated game characters, weapons, or other virtual items of value. Gamers may utilize cards to trade such items and characters with other gamers. Information may then be communicated back to a remote server (e.g., via codes generated on the displays of an item or character receiving card). Such virtual characters and items may then appear in the account of a receiving gamer. Virtual currency may also be communicated between cards.

A card may emit a sound or other sensory indication when a cardholder cannot find a card and requests the location of a card from an issuer's website. A card may include a receiver for wireless signals (e.g., cellular signals) such that the remote server may issue a command for the card to produce such a sensory indication.

Co-branded payment cards may utilize a dynamic magnetic stripe communications device, display, and various other components to provide additional functionality. For example, a payment card may be co-branded with a particular website, a hotel chain, an airline company, a rental car company, or any other type of company. For example, food and drink coupons may be communicated onto a credit card co-branded with an airline. Such food and drink coupons may be awarded as the result, for example, of frequent travelling. A user may then utilize such coupons while on board the airline. The information may be communicated via a display (e.g., a code or dynamic barcode), a surface-exposed IC chip communication, a light-based or sound-based communication, an RFID communication, or a dynamic magnetic stripe communication. An expiration may be associated with such redemptions.

A button may be provided on a card that allows a user to pay with miles. Thus, for example, a user may earn miles by flying on an airline. A mile total may be communicated to a card. Regardless, for example, a user may press a button on a card to pay for an item with miles. Information may be included in a communicated data stream (e.g., data may be included in track 1 and track 2 of magnetic stripe data) indicative of a user's intention to pay with miles. A user may earn a multiple of a mile or bonus miles for particular purchases (e.g., airline ticket purchases). Similarly, a user may redeem miles at a discount or at a division of miles for particular redemptions (e.g., redeeming miles for a free beverage in a flight). Different classes of accounts (e.g., bronze, silver, gold, platinum) may have different point redemption bonuses in particular instances. For example, a gold cardholder may be able to purchase a 1,000 mile beverage for 25% off (e.g., 750 miles) while a silver cardholder may only be able to purchase a 1,000 mile beverage for 10% off (e.g., 900 miles).

A user's status within a program may be pre-set into a card or communicated to a card after issuance and displayed to a user. For example, a user may have a particular status at an airline (e.g., silver, gold, platinum, chairman status). A user with a changed status may communicate this new status information to the user's card. In turn, for example, a card having a different status may perform differently. For example, a card with a gold status may display a particular status indicia on a display. As per another example, an LED of a particular color of light may activate instead of a different LED (or an LED may emit a particular color of light) at a particular instance (e.g., when a user presses a particular button). Furthermore, for example, a particular status may provide additional functionalities. For example, a cardholder having a gold status may be able to download boarding passes to a card while a cardholder having a silver status may not be able to download boarding passes to a card.

Medical cards may be provided in which patient data may be pre-loaded by an issuer onto a card or communicated to a card by a user. Patient data may include, for example, plan numbers, co-pays, prior medical history. An unlocking code may be utilized to unlock a card. In case of emergencies, emergency personnel may call the provider to obtain a master unlocking code for the card (e.g., by providing their emergency personnel identification data and an identification data of the card).

Handshaking may occur between a card and a device (e.g., a mobile telephonic device, another card, or an ATM machine). For example, a card may be unlocked by a user by the user entering an unlocking code into buttons on a card (e.g., by entering the manual input sequence of "A-A-B-B-C-C-D"). A card may then exchange handshaking data with the device to perform a secure handshake. In such a handshake, the identity of each device may be verified (e.g., via properly transmitted codes). Data may then be communicated, for example, securely via an encryption method communicated in the handshaking process.

Transportation currency (e.g., a subway currency) may be added to a card (e.g., a credit card). Accordingly, a user may press a button associated with the transportation currency such that the appropriate information may be communicated through an output communications device (e.g., a dynamic magnetic stripe communications device) to complete a transportation payment transaction. For example, a transportation account number may be communicated through a magnetic stripe reader to a remote server. The remote server may remove an amount of money from that account. The remote server may provide a request for payment to the user's credit card company. In turn, for example, the user's credit card company may pay the transportation fee to the transportation provider and credit the user's account for the transportation amount. A service fee may be charged on a periodic basis (e.g., annual or monthly basis) or may be charged with each transportation payment transaction.

A card may have, for example, different payment attributes that can be selected by a user. For example, a user may select to obtain a particular level of rewards for a surcharge amount or no rewards (or a different level of rewards) for a lower purchase amount. Furthering the example, different payment accounts may be communicated through the infrastructure (e.g., via a dynamic magnetic stripe communications device) where each different account is associated with a different interchange rate. Alternatively, for example, a user may press one button if the user desires to pay for a purchase on credit that also earns the user a particular amount of rewards and a user may press a different button if the user desires to pay for a purchase on credit at a discount without earning any rewards. The information associated with the desired payment attributes may be communicated in, for example, discretionary data communicated from a dynamic magnetic stripe communications device to a magnetic stripe reader.

A card may include a wire-based port for receiving power from a power source (e.g., USB or AC power). Accordingly, for example, a card may be recharged by a user. A card may be charged wirelessly (e.g., via an electromagnetic field) by another device.

A gambling card may be provided, in which a gambling account number may be utilized to keep track of points. Money may be won and transferred to a card. A card's stored value may be debited to pay for games and other items (e.g., food). Similarly, for example, an account number may be communicated such that monetary values are added to, or subtracted from, a gambling account.

A card may be provided with environmentally friendly components. For example, the card may be colored green and may include a green-tinted bi-stable display and one or more green sources of light. Such components increase the whimsical and festive nature of such a card. For example, a battery having organic components and a display having organic components may be utilized on a card. At least a part of the laminates utilized to laminate the electronics of a card may include, for example, bioplastics.

Payment attributes may be stored on a card and displayed to a user. For example, a card's APR, credit limit, and monthly payment due dates, may be pre-loaded onto a card. A cardholder may display such terms by pressing one or more buttons. Such information may be cycled through a display at a particular periodicity.

A salary card may be provided to employees as compensation. Such salary cards may, for example, include information such as a user's next pay-date and may include pre-loaded bonuses for additional compensation. For example, a Walmart salary card may include additional employee-only coupons and discounts on a card. Furthermore, for example, a company may allow a user to transfer salary compensation onto a card wirelessly (e.g., via light). A card may generate a code upon properly receiving and loading such value. This code may be entered back into the GUI that is pulsating the light to confirm proper receipt of the compensation. Persons skilled in the art will appreciate that an actual virtual currency may not be transferred and stored on a card, but authorized or added to a card account represented on the card. Accordingly, the compensation may, for example, be transferred to an account associated with the card. The card may communicate an account number in order to utilize such an account in transactions.

A user may select a top-up amount for a particular pre-paid payment product. For example, a user may have a pre-paid transit card with a top-up amount of $25 whenever the card falls below a particular payment amount (e.g., $10). A user may be topped-up to a particular amount (e.g., $35) whenever the card falls below a particular amount (e.g., $10). Value may be stored on a card and a user may select a top-up amount at his/her discretion. This top-up amount may be communicated through a card communication (e.g., a dynamic magnetic stripe communication) and the top-up amount may be transacted as a purchase on an account of a user (e.g., checking, debit, or credit account). A stored-value card may have pre-defined or user set limits of stored-value (e.g., $100).

Multiple accounts may be provided on a card such that a user may select a particular account to complete a payment transaction (e.g., via a button). For example, a user may select from a personal line of credit, a small business line of credit, a home equity line of credit, an auto loan, an investment account, a mortgage account, or any type of account. Upon selecting a button, the appropriate data may be communicated through an output device (e.g., a dynamic magnetic stripe communications device).

Similarly, for example, a variety of debit card accounts may be provided on a card. For example, one button may be associated with a checking account and another button may be associated with a savings account. Accordingly, for example, a cardholder may select the account to use funds from to complete a purchase transaction and associated data may be communicated via an output device.

A card may receive a communication indicative of a portfolio of stocks that a user has. A user may sell any such stocks at a point-of-sale by, for example, selecting the stocks to sell on the card such that the card communicates this information (e.g., via a dynamic magnetic stripe communications device) the next time a purchase is made.

A card account may be stored on a card, and communicated to complete a transaction via a magnetic stripe communication, that rounds up the transaction to a particular unit of currency. For example, a transaction may be rounded up to the nearest dollar and the rounded-up amount added to a particular user's account (e.g., a savings account). The rounded-up amount may, for example, be transferred from one of the user's accounts (e.g., a checking account) to another user's account (e.g., a savings account). A round-up amount may be, for example, every five dollars or ten dollars. A user may, similarly, select the account to receive the rounded-up portion such as to more quickly pay back a mortgage, student loan, automobile loan, or any other account. A user may indicate, on a card, an additional amount to be deposited into a particular account from another account. For example, a user may press a cash-back button and a mortgage button such that a cash-back amount (e.g., $10) is taken out of the user's savings account and used to pay off a user's mortgage account.

Figure 4:
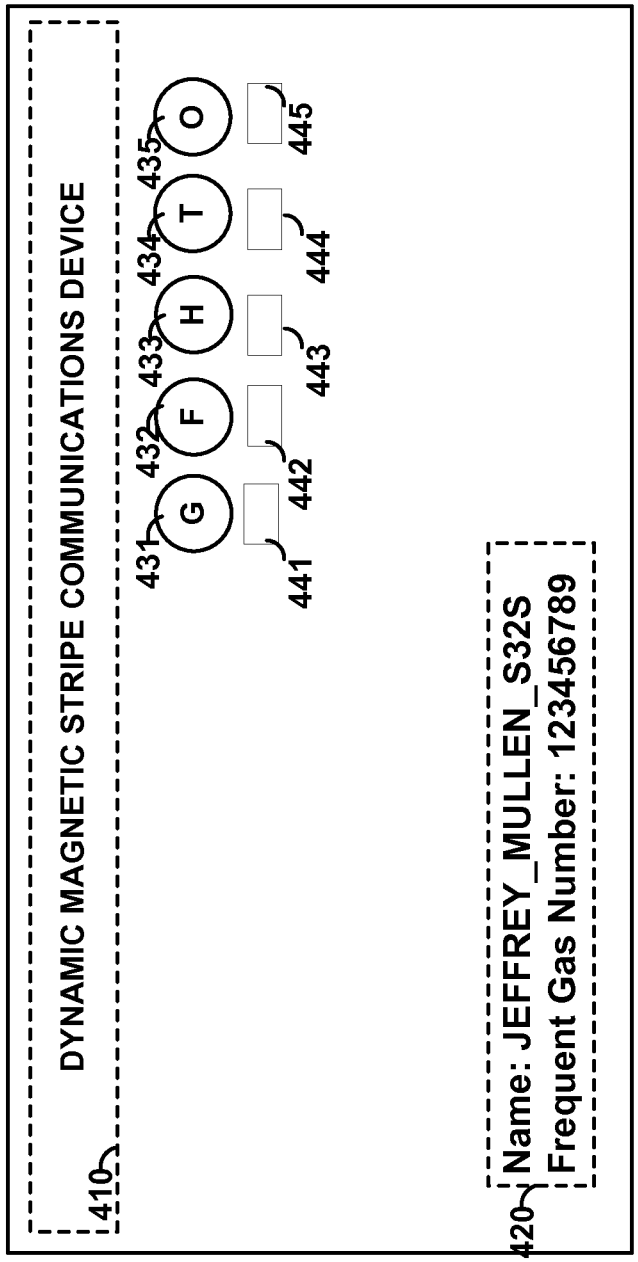
FIG. 4 is an illustration of a card constructed in accordance with the principles of the present invention.

Corporate purchase cards may be provided in which a user selects on a card (e.g., via a button) the type of purchase that is being made such that a company's accounting department may automatically recognize the accounting for the purchase. For example, a fleet card may be provided to a truck driver with a different button for tolls, food, gas, hotels, and other. Accordingly, the trucking company may be provided accounting information at the time of purchase (e.g., via a dynamic magnetic stripe communications device). Information associated with the trucker's selection may be communicated with the purchase in, for example, the discretionary data fields of one or more magnetic stripe tracks. This information may be received by a server of the corporation and utilized for any purchase (e.g., accounting). For example, FIG. 4 shows card 400 that includes user information 420, dynamic magnetic stripe communications device 410, buttons 431-435, and LEDs 441-445. Buttons 431-435 may correspond to LEDs 441-445, respectively. Accordingly, for example, if a user presses button 433, LED 443 may be turned ON for a period of time (e.g., approximately 15-120 seconds). Button 431 may be associated with gas. Button 432 may be associated with food. Button 433 may be associated with hotels. Button 434 may be associated with tolls. Button 435 may be associated with other. Accordingly, for example, a corporation may receive an itemized account of an employee's expenses via software that is able to discern information communicated from a card (e.g., via a dynamic magnetic stripe communications device) to a remote server of the corporation that is indicative of a type of purchase (e.g., food, gas, hotels, tolls, or other).

A payment type may be selected by a user that completes a purchase transaction, but allows a user's account to be debited/credited at a particular time (e.g., at bonus time) with any associated interest. Accordingly, for example, an issuer may provide a user with credit for a known period of time. An issuer may also be able to determine, for example, that the customer is having difficulty in paying for items and may utilize more credit in the future. Accordingly, an issuer may change a user's APR, annual fee, or total credit limit in response to such activities.

Payment cards with advanced gift card features may be provided. For example, a credit card may be provided. A user may earn points as a user utilizes such a credit card to make purchases. A user may redeem earned points for gift certificates. Such gift certificates may be mailed to the user. Alternatively, for example, such gift certificates may be loaded onto a user's card and redeemed in a store or online (e.g., via manual input or wireless input such as via light). Gift certificate data may be communicated via an output device (e.g., a dynamic magnetic stripe communications device). A dynamic barcode may be displayed on a display such that gift certificate information may be communicated to a computer vision eye (e.g., a laser-eye) of a cash register system. Codes may be entered into a card manually via buttons (e.g., or communicated to a card wirelessly such as via light). A card may include, for example, buttons for a credit card account, debit card account, and gift card account.

Cards may be utilized for contests and promotions. For example, a television show may be aired that includes a light-pulsating region for communicating light pulses for a period of time. The location of the light-pulsating region may change between multiple locations based on regions. Different regions may have different information communicated through the light-pulsing regions. The next time the show is aired, the show may be preceded with an announcement of the locations of the pulsating region during the last show for that region (or regions), the location of the winning region, and the location of the pulsating region for that winning region. Information communicated through a winning region may cause a card to operate in a particular way (e.g., say "winner" and/or a portion may light-up in the color GREEN). Information communicated through a non-winning region may cause a card to operate in a particular way (e.g., say "not this time" and/or a portion may light-up in the color RED). The received information may include a winning code and either all of the cards in that region may win or only cards in that region that correspond to the winning code may win. For example, a winning code may be decrypted differently by different cards to determine whether or not the code is a winner by the card. The winning code (as well as an indication of which decryption algorithm was the correct decryption algorithm) may be displayed on a display for redemption. A winning code may be redeemed, for example, for cash or non-cash prizes.

A welcome operation may be performed when, for example, a card is turned ON. For example, a card may display text that says "welcome Jeff." A light sensor on a card may determine when a wallet is being opened and such a welcome operation may autonomously be performed by a card when the card detects the situation of the opening of a wallet. An inertial movement sensor may be utilized in conjunction with a light sensor to determine the opening of a wallet.

A contest card may be provided such that whenever a purchase is made, information indicative of the card being able to operate with a particular contest is communicated through a magnetic stripe communication with a payment account number. A game piece may then be emailed to the owner, for example, of the card. A user may open an email and be provided with a link to a GUI or a GUI itself operable to communicate information via light or sound pulses. Such game pieces may then be transferred to a card. The card may determine whether or not the game piece is a winner and/or the type of cashless or non-cashless prize that is won. The card may collect multiple game pieces and determine a winner based on a combination of collected game pieces. For example, a card may be provided with boxes around the edges signifying the boxes of a Monopoly gameboard. Game pieces may be associated with particular boxes and cause light sources under those boxes to light up whenever a card is turned ON or instructed to show the progress a user has made in the contest. A digital version of the board may be accessible online by the user such that if a card is lost, the information may be retransmitted (e.g., via light, sound, or manual codes) to a card. A game card may be purchased (e.g., for $10 at a participating store) and the game may be played online without the use of a card. A card may be provided with a particular type of purchase (e.g., a purchase over $10).

An educational card may be provided. Questions may be asked on a television show (e.g., Sesame Street may ask the question "what color is Big Bird"). A number of answers may be provided on the television show and each answer may have a different light-pulsating region. A user may hold up a card to the region corresponding with a particular answer to determine whether the answer is correct or incorrect. A card may keep track of point totals. Information in the light-pulses may note the question that was asked so that only the first communicated answer for a question is registered on a card for record keeping.

Figure 5:
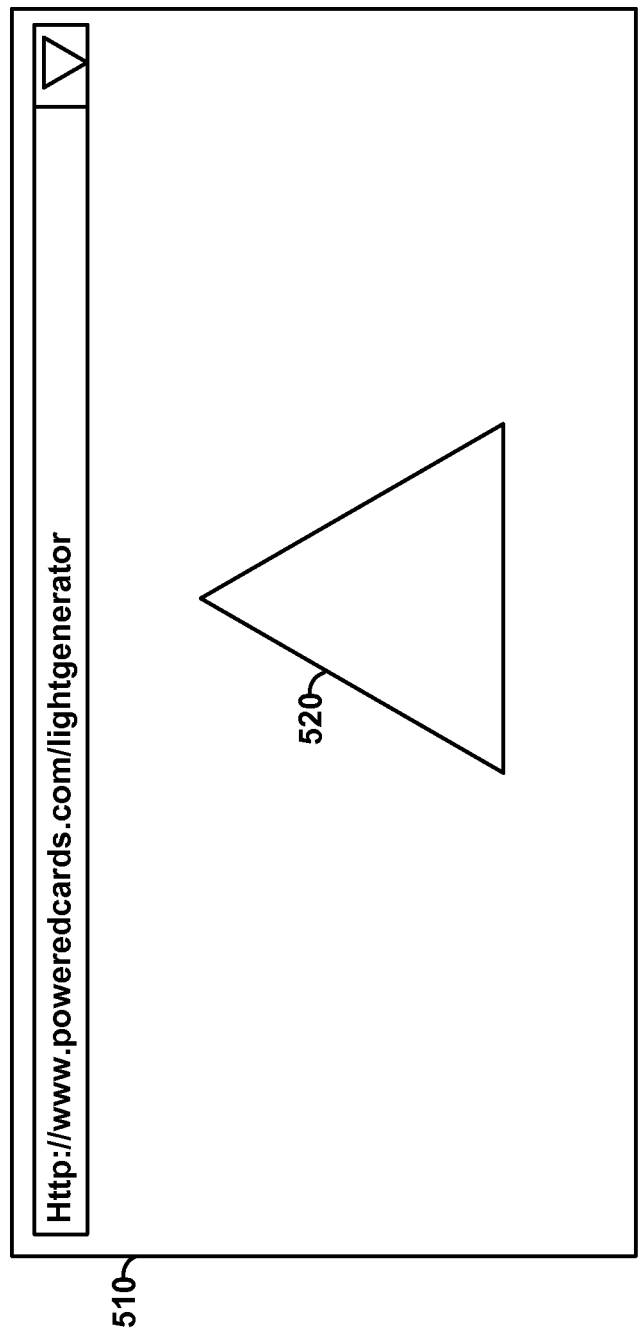
FIG. 5 is an illustration of a graphical user interface constructed in accordance with the principles of the present invention.

FIG. 5 shows graphical user interface 510. Graphical user interface 510 may be utilized, for example, as an application for a device (e.g., a mobile telephonic device), a web browser, or any other type of interface. Light region 520 may be utilized, for example, to communicate information to a card via light. For example, light region 520 may blink information to a card (e.g., by alternating between displaying black and white) in order to communicate information. For example, different blinking patters may correspond to different bits of data. Information to be communicated via region 520 may be, for example, provided by a remote server (not shown).

Figure 6:
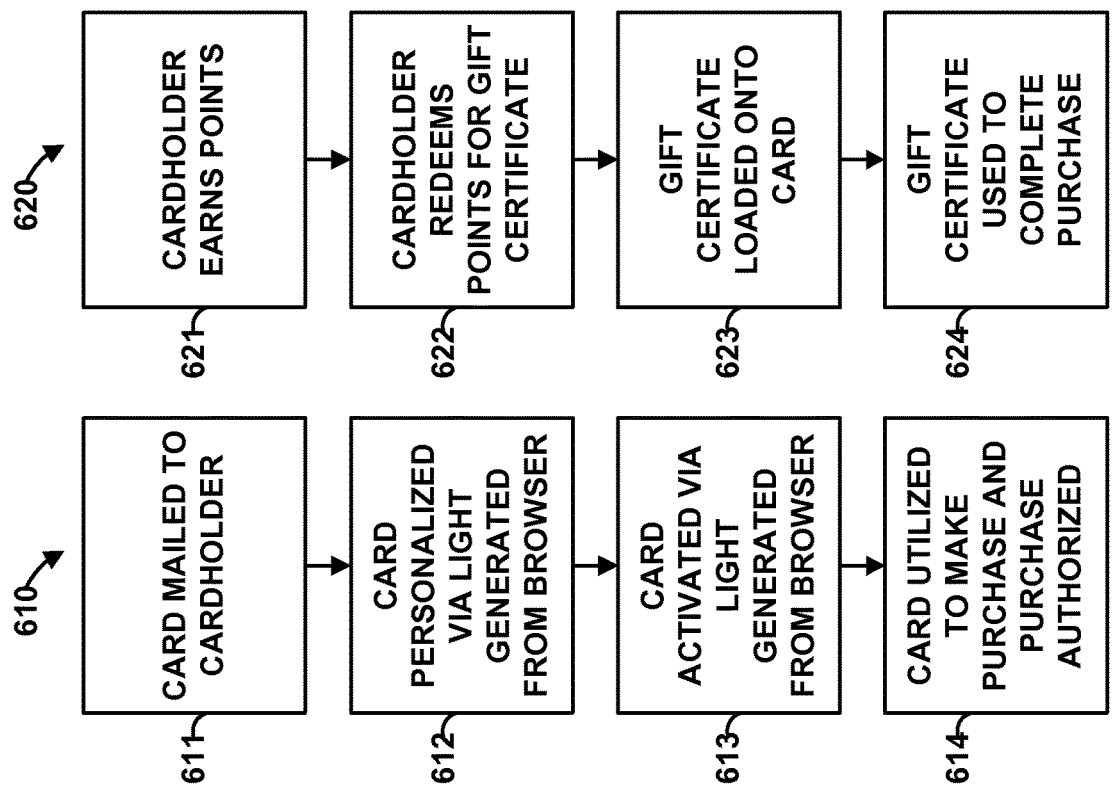
FIG. 6 is an illustration of process flow charts constructed in accordance with the principles of the present invention.

FIG. 6 shows a number of process flow charts. Process flow chart 610, for example, may be included. A card may be mailed to a cardholder in step 611. A card may be personalized via light that is generated from a web browser in step 612. A card may be activated via light generated from the web browser in step 613. The personalized card may be utilized to make a purchase and the purchase may be authorized in step 614.

Process flow chart 620 may be included. Step 621 may be included, in which a cardholder may earn points. A cardholder may earn points, for example, by purchasing products using a payment card account. A user may be provided with a particular number of points for every dollar spent. For example, a user may be provided with one amount of points per dollar of debit and a second amount of points per dollar of credit. The amount of points per dollar of credit may be higher than the amount of points per dollar of debit. A card may include, for example, a button indicative of the ability of a card to communicate data representative of a user's desire to purchase an item with earned points. Accordingly, information may be communicated via an output device (e.g., a dynamic magnetic stripe communications device, RFID, and/or an exposed IC chip). In this manner, a user may earn points by, for example, pressing a button on a card indicative of purchasing an item via debit. A user may earn points by, for example, pressing a different button on a card indicative of purchasing an item via credit. A user may spend points to purchase an item by, for example, pressing yet a different button on a card indicative of spending points to purchase an item. Different magnetic stripe data may, for example, be communicated through a dynamic magnetic stripe communications device depending on the button pressed by the user. A cardholder may, for example, redeem earned points for a gift certificate in step 622. A gift certificate that was purchased using points may, for example, be loaded into the card in step 623 either manually (e.g., via a code manually entered into buttons on the card), wirelessly (e.g., via light and/or sound), and/or via a wire-based communication (e.g., USB). The gift certificate loaded into the card may, for example, be utilized to complete a purchase in step 624. For example, a user may press a button associated with loaded gift cards and communicate associated information through an output device to a card reader (e.g., via a dynamic magnetic stripe communications device to a magnetic stripe card reader). Persons skilled in the art will appreciate that a remote server (not shown) may be provided to maintain a balance of points for a user. Such a point balance may be updated, for example, as points are redeemed at the point-of-sale (e.g., via an output device) or online (e.g., via a code displayed on a display that is entered into an online security code entry box) for items, online via a website for gift certificates, or earned either at the point-of-sale or online.

Figure 7:
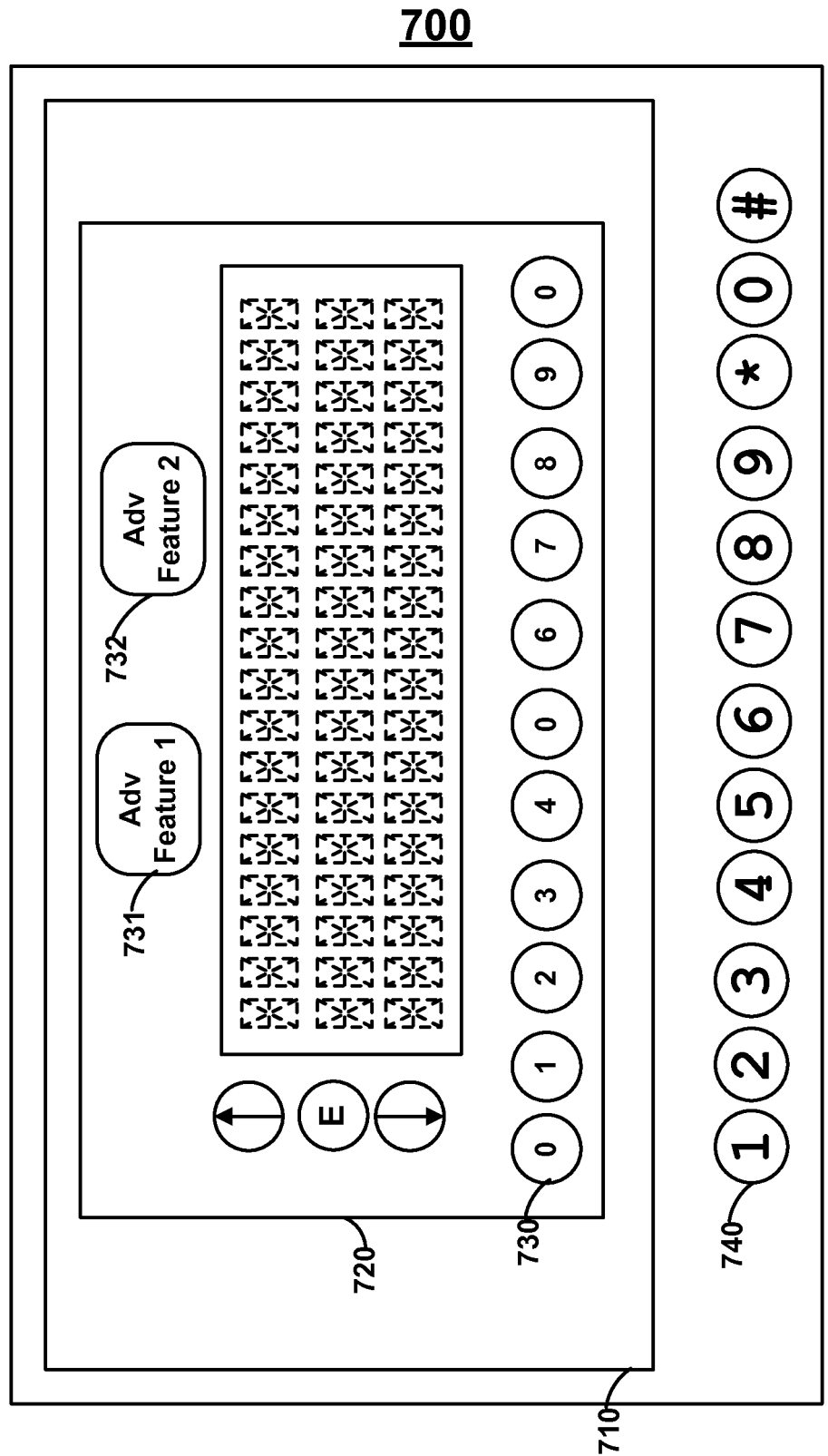
FIG. 7 is an illustration of a device constructed in accordance with the principles of the present invention.

FIG. 7 shows device 700 that may be, for example, a portable computer (e.g., a laptop or tablet computer), a mobile telephonic device, or any other device. Device 700 may include, for example, physical buttons 740, display 710, virtual buttons 730, and virtual card 720. Display 720 may be, for example, a touch-sensitive display such as a pressure sensitive and/or capacitive sensitive touch screen. Persons skilled in the art will appreciate that any physical card may be provided as a virtual card on a device. Physical buttons may correspond, for example, to virtual buttons. Device 700 may include, for example, output devices to communicate information (e.g., information selected by virtual buttons) to a card reader. For example, device 700 may include an RFID, a dynamic magnetic stripe communications device operable to communicate data across a distance of approximately a quarter of an inch to a read-head of a magnetic stripe reader, and/or a flip-out structure that includes an exposed IC chip, RFID, and/or a dynamic magnetic stripe communications device. Advanced feature virtual button 731 may, for example, be utilized by a user to initiate a feature that may provide particular data to be displayed (e.g., a particular payment card account number) and particular data to be communicated via an output device (e.g., a particular payment card account number via an RFID). Advanced feature virtual button 732 may, for example, be utilized by a user to initiate a feature that may provide particular data to be displayed (e.g., a gift card account number) and particular data to be communicated via an output device (e.g., a gift card account number via an RFID).

Persons skilled in the art will also appreciate that the present invention is not limited to only the embodiments described. Instead, the present invention more generally involves dynamic information. Persons skilled in the art will also appreciate that the apparatus of the present invention may be implemented in other ways than those described herein. All such modifications are within the scope of the present invention, which is limited only by the claims that follow.

What is claimed is:

1. A card comprising:
a dynamic magnetic stripe communications device configured to emulate a magnetic stripe and communicate data to a magnetic stripe reader;
read head detection circuitry that is operable to detect which direction said dynamics magnetic stripe communication device is swiped and modify data encoding based on said detected swipe direction;
a light sensing unit configured to receive encoded light signals;
a battery; and
a memory,
wherein contest applicability information and a payment account number is communicated through said dynamic magnetic stripe communication device to a magnetic stripe reader based on said detected swipe direction to complete a purchase and, in response to said purchase completion, a game piece is operable to be downloaded to said card via said light sensing unit;
wherein said dynamic magnetic stripe communications device is operable to communicate user-specific and card-specific information dynamically from memory in response to the read head detection circuitry detecting a swipe direction; and
wherein said light sensing unit is further operable to detect variations in received light intensity and pulse speed to decode game piece data.

2. The card of claim 1, wherein said game piece is communication to said card via light pulses received by said light sensing unit.

3. The card of claim 1, wherein said game piece is located via an electronic medium and said electronic medium includes a link to a graphical user interface contained within an email.

4. The card of claim 1, wherein said game piece is located via an electronic medium and said electronic medium includes a graphical user interface.

5. The card of claim 1, wherein said game piece is communicated to said card by changing a speed of light pulses received by said light sensing unit.

6. The card of claim 1, wherein said game piece is communicated to said card by changing an intensity of light pulses received by said light sensing unit.

7. The card of claim 1, wherein said card determines whether said game piece is a winner.

8. The card of claim 1, wherein said card determines that said game piece is a winner and whether a cashless prize is associated with said win.

9. The card of claim 1, wherein said card determines that said game piece is a winner and whether a non-cashless prize is associated with said win.

10. The card of claim 1, wherein said game piece is one of a collection of game pieces and said collection of game pieces is operable to be collected by said card.

11. The card of claim 1, wherein said game piece is one of a collection of game pieces, said collection of game pieces is operable to be collected by said card and said card is operable to determine whether said collection is a winner.

12. The card of claim 1, further comprising a light source, wherein said light source provides indicia that said game piece is downloaded.

13. The card of claim 1, further comprising a plurality of light sources, said game piece is one of a collection of game pieces downloaded into said card and one of said plurality of light sources provides indicia that an associated game piece is downloaded.

14. The card of claim 1, further comprising a button, wherein said contest applicability information and said payment account number are communicated based on a signal from said button.

15. The card of claim 1, further comprising a read-head detector, wherein said contest applicability information and said payment account number are communicated when a read-head is detected by said read-head detector.

16. The card of claim 1, further comprising a processor.

17. The card of claim 1, further comprising:
a processor; and
a button.

18. The card of claim 1, further comprising:
a processor;
a button; and
a display.

19. The card of claim 1, further comprising a display, wherein said display provides an indication that said light sensing unit is ready to download said game piece.

20. The card of claim 1, further comprising a display, wherein said display provides an indication that said game piece is downloaded.

21. The card of claim 1, wherein said light sensing unit is operable to receive data from another card.

* * * * *